UNITED STATES PATENT OFFICE.

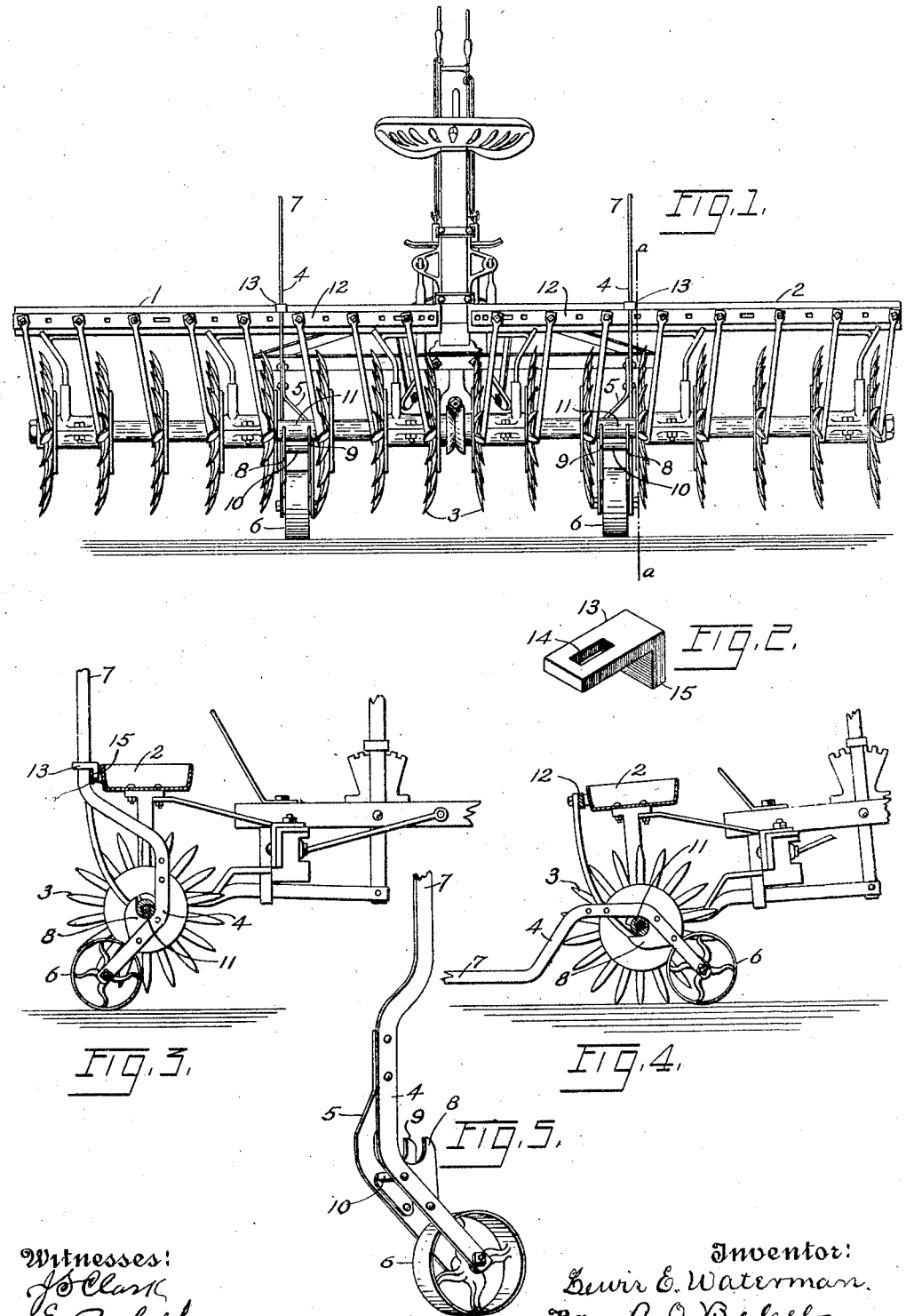

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

WHEEL-SUPPORT FOR HARROWS.

1,025,767.   Specification of Letters Patent.   Patented May 7, 1912.

Application filed April 21, 1908. Serial No. 428,450.

*To all whom it may concern:*

Be it known that I, LEWIS E. WATERMAN, a citizen of the United States, residing at Rockford, in the county of Winnebago and State of Illinois, have invented certain new and useful Improvements in Wheel-Supports for Harrows, of which the following is a specification.

The object of this invention is to provide means for supporting a harrow on wheels for transportation to and from the field, and which are readily removable while the harrow is working.

In the accompanying drawings, Figure 1 is a rear elevation of a harrow held in its elevated position upon supporting wheels. Fig. 2 is a perspective view of the holding clamps. Fig. 3 is a transverse section showing the harrow in its elevated position on dotted line $a\ a$ Fig. 1. Fig. 4 is a transverse section on dotted line $a\ a$ Fig. 1, showing the harrow lowered. Fig. 5 is a perspective view of one of the supporting wheels.

The harrow is of a well known construction and comprises the two sections 1 and 2, each composed of a plurality of heads 3. The usual draft connections are employed together with the usual levers for adjusting the angles of the sections with respect to each other. The wheel supports for supporting the sections, are in this instance right and left which is made necessary owing to the construction of the heads of the sections, but in other constructions of heads they may be of like construction.

At Fig. 5 is shown one of the wheel supports in perspective, and comprises the side bars 4 and 5, between which is pivoted a wheel 6. These side bars are connected together and terminate in a handle portion 7. To the side bars 4 and 5 adjacent to the wheel 6 are secured hook extensions 8 and 9 respectively. A cross-bar 10 holds the side bars 4 and 5 separated so as not to cramp the wheel in its bearings.

Fig. 4, shows the position of the wheel support in its connection with the tubular section 11 between two of the heads 3 of a section. The hooks 8 and 9 encircle the tubular section, and the wheel 6 is ahead of the vertical center of the heads. By raising on the handle portion 7 of the wheel support, the wheel 6 is moved rearward of the vertical center of the heads as shown in Fig. 3, and the handle portion 7 of the wheel support rests against the rear face of the scraper-bar 12. A clamp shown at Fig. 2, has a section 13 provided with an opening 14, and a depending section 15. The clamp is placed over the handle portion 7 of the wheel support, and the depending section 15 engages the front face of the scraper-bar as shown at Fig. 3, which will hold the wheel support against the scraper-bar, and prevents the wheel 6 from moving ahead of the vertical center of the heads, when the harrow is moved rearward. By the employment of the two hooks 8 and 9 suitably separated, the wheel support will be held in a vertical position, that is, it will not rock laterally. When the harrow is lowered into its working position, the wheel supports are removed so as not to interfere with the working of the harrow.

I claim as my invention—

A wheel support for harrows, comprising a frame formed of a substantially straight handle portion and a lower forwardly curved portion having a rearwardly extending lower end, a wheel journaled on said lower end and having its axis disposed substantially in the longitudinal plane of the handle portion, and a rearwardly extending harrow-engaging projection carried by and located in the curved portion, said arrangement placing the weight of the harrow upon the support in advance of the wheel when the handle is elevated.

In testimony whereof I have hereunto set my hand in presence of two subscribing witnesses.

LEWIS E. WATERMAN.

Witnesses:
A. O. BEHEL,
E. D. E. N. BEHEL.